US010460605B2

(12) United States Patent
Luhmann et al.

(10) Patent No.: US 10,460,605 B2
(45) Date of Patent: Oct. 29, 2019

(54) DRIVER ASSISTANCE SYSTEM FOR A MOTOR VEHICLE

(71) Applicant: Robert Bosch GmbH, Stuttgart (DE)

(72) Inventors: Thomas Luhmann, Leonberg (DE); Klaus Baur, Mietingen (DE); Marcel Mayer, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/539,717

(22) PCT Filed: Jan. 15, 2016

(86) PCT No.: PCT/EP2016/050805
§ 371 (c)(1),
(2) Date: Jun. 26, 2017

(87) PCT Pub. No.: WO2016/124374
PCT Pub. Date: Aug. 11, 2016

(65) Prior Publication Data
US 2018/0012495 A1 Jan. 11, 2018

(30) Foreign Application Priority Data

Feb. 2, 2015 (DE) .......................... 10 2015 201 723

(51) Int. Cl.
*G08G 1/16* (2006.01)
*B60W 50/00* (2006.01)
(Continued)

(52) U.S. Cl.
CPC ........... *G08G 1/166* (2013.01); *B60W 30/095* (2013.01); *B60W 50/0098* (2013.01);
(Continued)

(58) Field of Classification Search
USPC .......................................................... 701/70
See application file for complete search history.

(56) References Cited

U.S. PATENT DOCUMENTS 7,827,256 B2 * 11/2010 Phillips ................... G06F 8/656
709/220
8,035,508 B2 * 10/2011 Breed ..................... B60C 11/24
340/539.11
(Continued)

FOREIGN PATENT DOCUMENTS

DE 102006017178 A1 10/2007
DE 102011112383 A1 3/2013
(Continued)

OTHER PUBLICATIONS

International Search Report dated Jan. 15, 2016, of the corresponding International Application PCT/EP2016/050805 filed Apr. 22, 2016.

*Primary Examiner* — Jean Paul Cass
(74) *Attorney, Agent, or Firm* — Norton Rose Fulbright US LLP; Gerard Messina

(57) ABSTRACT

A driver assistance system for motor vehicles, including at least one sensor for detecting object properties of objects which are located in the surroundings of the motor vehicle; a first interface; an output unit for transmitting the object properties to a user; and a control unit. The sensor transmits the object properties in a form of a first signal to the first interface. The first interface transmits the object properties, received in the form of the first signal, to the control unit in the form of a second signal, the control unit being configured to forward the object properties, received in the form of a second signal, to the output unit and to control the output of the object properties by the output unit.

14 Claims, 1 Drawing Sheet

(51) Int. Cl.
    *B60W 30/095*    (2012.01)
    *B60W 50/14*     (2012.01)
    *B60W 30/14*     (2006.01)
    *B60K 37/00*     (2006.01)

(52) U.S. Cl.
    CPC ............. *B60W 50/14* (2013.01); *B60K 37/00* (2013.01); *B60K 2370/179* (2019.05); *B60K 2370/184* (2019.05); *B60K 2370/334* (2019.05); *B60K 2370/566* (2019.05); *B60K 2370/589* (2019.05); *B60W 30/14* (2013.01); *B60W 2050/0043* (2013.01); *B60W 2050/146* (2013.01); *B60W 2422/00* (2013.01); *B60W 2520/06* (2013.01); *B60W 2520/10* (2013.01); *B60W 2550/10* (2013.01); *B60W 2750/40* (2013.01)

(56) References Cited

U.S. PATENT DOCUMENTS

| | | | | |
|---|---|---|---|---|
| 8,410,945 B2* | 4/2013 | Breed | ............... | B60C 11/24 340/601 |
| 8,482,399 B2* | 7/2013 | Breed | ............... | G06Q 10/06 340/500 |
| 8,682,503 B2* | 3/2014 | Bosch | ............... | G08C 17/02 701/2 |
| 8,786,437 B2* | 7/2014 | Breed | ............... | G01P 15/02 340/539.13 |
| 9,015,071 B2* | 4/2015 | Breed | ............... | G06Q 10/06 705/28 |
| 9,121,717 B1* | 9/2015 | Zhu | ............... | B60W 30/16 |
| 9,151,692 B2* | 10/2015 | Breed | ............... | B60C 11/24 |
| 9,916,538 B2* | 3/2018 | Zadeh | ............... | G06N 7/005 |
| 2004/0119612 A1* | 6/2004 | Chen | ............... | G08G 1/0104 340/995.13 |
| 2006/0132924 A1* | 6/2006 | Mimran | ............... | G02B 27/01 359/630 |
| 2012/0197523 A1* | 8/2012 | Kirsch | ............... | G01C 21/362 701/426 |
| 2013/0012179 A1* | 1/2013 | Watkins | ............... | H04L 67/34 455/418 |
| 2014/0172228 A1* | 6/2014 | Wilson | ............... | B60W 50/02 701/31.5 |
| 2014/0359272 A1* | 12/2014 | Hiltunen | ............... | G09C 1/00 713/150 |

FOREIGN PATENT DOCUMENTS

| | | |
|---|---|---|
| JP | H11120498 A | 4/1999 |
| JP | 2000315299 A | 11/2000 |
| JP | 2003287428 A | 10/2003 |
| JP | 2013041444 A | 2/2013 |
| JP | 2013124957 A | 6/2013 |
| JP | 2014051156 A | 3/2014 |
| JP | 2015501455 | 1/2015 |

* cited by examiner

DRIVER ASSISTANCE SYSTEM FOR A MOTOR VEHICLE

FIELD

The present invention relates to a driver assistance system for a motor vehicle.

BACKGROUND INFORMATION

Motor vehicles are increasingly equipped with driver assistance systems, which include in particular comfort-oriented driver assistance systems and electronically controllable brake assist system, in particular with an emergency brake assist system.

Conventional driver assistance systems are generally activated and operated by the vehicle driver of the motor vehicle via corresponding operating elements or human-machine-interfaces (also called HMIs). In this context, conventional systems such as parking assistance systems detect the proximate traffic surroundings with the aid of ultrasonic sensors or video sensors and provide acoustic or visual feedback to the driver during a parking operation, and adaptive cruise control (ACC) recognizes preceding cars and adapts the distance and the speed of the host vehicle, and additionally implements a collision avoidance or collision mitigation function in the form of automatic brake application if an imminent risk of collision is detected based on the data from the surroundings sensors. However, these systems have already been previously installed in the vehicle by the vehicle manufacturer so that the individual system components are networked by cabling to one another and to other vehicle systems. Retrofitting into a vehicle has been previously impossible or possible only with great difficulty. Due to the individual adjustment to the respective vehicle type and due to the comprehensive safety regulations that must be complied with, such driver assistance systems are complex, inflexible, and cost intensive.

It is an object of the present invention to provide a driver assistance system for a motor vehicle, which conveys helpful information to the driver about objects located in the surroundings of the motor vehicle, which may be quickly and easily installed in a motor vehicle, even retroactively, and is thereby inexpensive and space saving.

Advantageous embodiments, variants, and refinements of the present invention are described herein.

SUMMARY

A driver assistance system for motor vehicles according to the present invention includes at least one sensor for detecting object properties of objects located in the surroundings of the motor vehicle; a first interface, an output unit for transmitting the object properties to a user; and a control unit. The sensor transmits the object properties in the form of a first signal to the first interface. The first interface transmits the object properties, received in the form of the first signal, to the control unit in the form of a second signal, the control unit being configured to forward the object properties, received in the form of the second signal, to the output unit and to control the output of the object properties by the output unit. In one advantageous embodiment, the control unit is a processor of a mobile unit, in particular of a smartphone. Advantageously, these types of mobile units generally already have diverse user interfaces and thus need only to be expanded by corresponding additional functions. This type of expansion is carried out in many of these mobile units, e.g., in smartphones, simply by downloading corresponding application software (APP) into the device, the processor being subsequently controlled via the APP implemented on the mobile unit. The control unit is configured to process the object properties before forwarding to the output unit, in particular as a function of the user inputs received via an input mask of the APP. By using a processor of a mobile unit, the driver assistance system is not linked to a specific motor vehicle and may be used quickly and easily in almost any motor vehicle. Basically, consoles are available for these types of mobile units which permit that the device may be detachably applied in a conveniently reachable position of the motor vehicle, for example, on the dashboard.

Advantageously, the processing of the object properties includes that the object properties are processed as a function of data detected by at least one sensor of the mobile unit. The sensor may, for example, be a radar sensor as is also used in known ACC systems. Preferably, the sensor housing is then modified in such a way that it may be attached with the aid of suction cups or by gluing, to a suitable point on or in the vehicle, for example, on the inner surface of the windshield. The necessary cabling is limited to a power supply cable via which the sensor may be connected to the vehicle battery, for example, via an electrical connection already present in the vehicle, for example, in the form of a cigarette lighter. A radar sensor may be likewise installed, for example, on the rear window of the vehicle or on the roof lining in the rear area of the vehicle so that monitoring the rear space of the vehicle, including the adjacent lane and a large part of the blind spot, is facilitated to provide, for example, a lane change assistance function when passing on express highways.

In addition, the processing of object properties in a preferred specific embodiment includes that the object properties are incorporated into a graphic or a diagram, and/or that the object properties are superimposed with a camera image from a camera of the mobile unit.

Advantageously, the output unit is a display of the mobile unit, the object properties being transmitted to the driver in the form of a graphic output of the APP, and/or acoustically via a loudspeaker of the mobile unit. In this way, for example, a distance warning function may be implemented. The information provided by the sensor about distances to other road users may then be represented on the display of the user interface as text, by symbols, pictograms, or also in the form of an image, for example, in the form of a situation image from a bird's eye view.

Alternatively, the control unit is a processor of a navigation system which is installed in the motor vehicle. In another preferred embodiment, the output unit is part of a GPS navigation device of the motor vehicle, and the object properties being transmitted in visual and/or acoustic form to the user via the GPS navigation device of the motor vehicle.

In one alternative specific embodiment, the output unit is a projector which transmits the object properties to the user in visual form, the visual transmission being carried out in particular in the form of a projection onto a windshield of the motor vehicle, which is generally quite visible for the driver.

Advantageously, the first signal is a signal of a vehicle-typical bus system, for example a CAN signal of a Controlled Area Network (CAN). Alternatively, the first signal may also be a LIN, MOST, and/or a FlexRay signal. While the MOST bus was, in particular, for multimedia applications, CAN busses are used with a bandwidth of ≤1 Mbit/s and LIN busses with a bandwidth of 20 Kbit/s for the control of the vehicle electronics. In contrast, FlexRay has a data rate of 10 Mbit/s. These bus systems basically facilitate the communication for controlling all possible driver assistance systems and additionally provide information to the dashboard, where the driver may read data, such as gasoline level or engine temperature.

The second signal is preferably a Bluetooth signal, the first interface converting the first signal into a Bluetooth signal. In an alternative specific embodiment, the second signal is a WLAN signal, and the interface converts the first signal into a WLAN signal. In this way, a wireless communication may be implemented which is used in most known mobile units like mobile telephones (smartphones), PIMs (personal information managers), PDAs (personal digital assistants), handhelds, and the like.

The objects are particularly preferably other road users, in particular motor vehicles or pedestrians, and/or obstacles in the surroundings of the motor vehicle. In one advantageous specific embodiment, the object properties include properties such as a geographic position, a distance and/or an angle of the objects relative to the motor vehicle, a speed, an acceleration, a differential speed relative to the motor vehicle, and/or a differential acceleration relative to the motor vehicle.

The control unit is particularly preferably is designed in such a way that it monitors the object properties for critical properties with respect to the course and/or the speed of the motor vehicle, in particular for imminent collisions or critical safety distances, and the critical properties being identified by the comparison of one or several of the object properties with threshold values of object properties stored in a memory of the control unit.

In one particularly advantageous specific embodiment, the control unit is designed in such a way that it outputs a warning to the user via the output unit if a critical property of the object properties has been detected. Advantageously, the output unit is a display of the mobile unit, and the warning includes that objects with critical properties of the object properties are indicated with a red blinking frame via the output unit. Basically, the windshield and also the display are quite visible to the driver during the drive, so that in the case of a detected critical traffic situation, visual warning signals may be output via the display or the windshield.

Preferably, the output unit is a display of the mobile unit, the object properties of different objects being grouped with respect to their values, and different marking intensities being assigned to the groups in the output unit.

If the output unit is a display of the mobile unit, then the object property is a differential speed to the motor vehicle, the differential speeds of the objects in the output unit being color coded in the display.

In one particularly advantageous embodiment, an additional output unit is provided, the control unit being configured to forward the output of the object properties to the output unit and also to the additional output unit.

The control unit is preferably a processor of a mobile unit, in particular of a smartphone, on which an application software (APP) is executed, the output unit being the display of the smartphone, the additional output unit being the display of a navigation device, and the forwarding of the object properties to the additional output unit being carried out by a mirroring function of the APP executed on the processor of the smartphone.

In this way, it is possible, for example, that a radar sensor is mounted in the rear area of the motor vehicle, the object properties detected by the sensor being forwarded to a mobile unit. In this case, the interface converts the CAN data into a Bluetooth signal. These Bluetooth signals are evaluated by the application software (APP) of the control unit, the control unit forwarding the output of the object properties to the output unit and also to the additional output unit. Thus, the object properties are represented not only on the display of the mobile unit, but also, for example, on a vehicle internal additional output unit, in particular on a display of a navigation system or another display in the motor vehicle, which mirrors the display of the mobile unit. It is thus possible that a sensor may be installed in the rear area of a vehicle while the mobile unit may remain, for example, in the center console or, for example in the case of a wireless mirroring between the output unit and the additional output unit, in the pants pocket, while the rear traffic is represented on the vehicle internal display. It is additionally possible that an NFC chip is located in the motor vehicle, and prompts the mobile unit to start the application software (APP) installed on the control unit and also the mirroring function upon entering the vehicle. In this way, it is possible that the user of the motor vehicle need only enter the motor vehicle and the rear traffic is displayed immediately on the output unit of the mobile unit and also on the additional output unit in the vehicle internal display.

Additional features, applications, and advantages of the present invention result from the subsequent description of the exemplary embodiments of the present invention which are depicted in the figures. It should be noted here that the depicted features have only descriptive character and may also be used in combinations with features of other refinements described above, and are not intended to restrict the present invention in any way.

BRIEF DESCRIPTION OF THE DRAWINGS

The present invention explained in greater detail below based on preferred exemplary embodiments, the same reference numerals being used for the same features.

DETAILED DESCRIPTION OF EXAMPLE EMBODIMENTS

Figure 1:
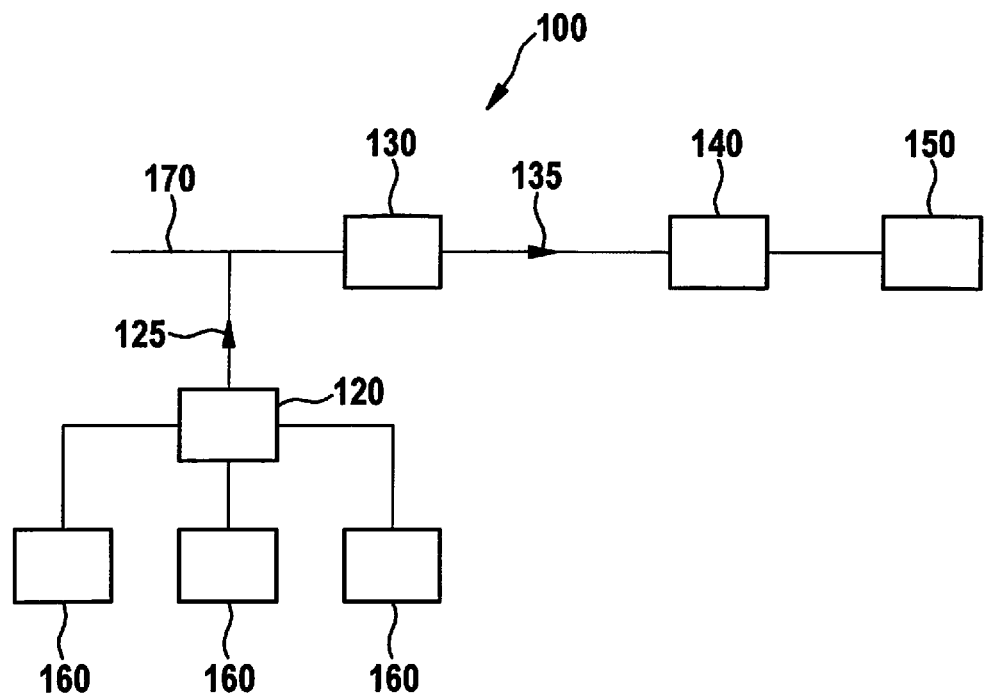
FIG. 1 schematically shows by way of example, a block diagram of a driver assistance system according to the present invention.

FIG. 1 schematically shows a driver assistance system 100 according to the present invention. Driver assistance system 100 includes a sensor 120 for detecting object properties of objects 160 which are located in the surroundings of the motor vehicle.

One or multiple sensor(s) 120, such as radar sensors, ultrasonic sensors, and/or video sensors, or the like may function as sensor 120 on suitable points outside or inside the motor vehicle. The installation complexity may be limited to the effect that a sufficiently stable fastening of sensor 120 and the laying of a power supply cable. Thus, for example, a radar sensor may be installed as sensor 120 on the dashboard and/or on the rear window of the vehicle, so that monitoring of the rear area of the vehicle, including the adjacent lane and a large part of the blind spot, is facilitated to provide a lane change assistant function for example during passing on express highways.

Sensor 120 transmits the object properties to an interface 130 in the form of a first signal 125. First signal 125 in the specific embodiment shown is a signal of a vehicle-typical bus system 170, in particular a CAN bus. A CAN bus is a known standard in the automotive field, which does not need to be explained in greater detail at this point. While the MOST bus was, in particular, for multimedia applications, CAN busses are used with a bandwidth of ≤1 Mbit/s and LIN busses with a bandwidth of 20 Kbit/s for the control of the vehicle electronics. In contrast, FlexRay has a data rate of 10 Mbit/s.

Interface 130 receives the object properties in the form of a first signal 125 and transmits them to a control unit 140 in the form of a second signal 135. The conversion of first signal 125 into second signal 135 is therefore necessary because one object of the present invention includes offering a retrofittable driver assistance system 100. It is therefore necessary that first signal 125, based for example on the known CAN standard, be converted into second signal 135, which is compatible with external mobile units 110, which may in some circumstances already be in the possession of a user and, if necessary, also be used for additional purposes, such as a smartphone. In preferred specific embodiments, second signal 135 is a Bluetooth signal or a WLAN signal. In this way, the object properties are transmitted from interface 130 to control unit 140 in a common signal standard.

Control unit 140 forwards the object properties to an output unit 150, control unit 140 forwarding the object properties, received in the form of second signal 135, to output unit 150 and being configured to control the output of the object properties by output unit 150. In this way, the information about the object properties of detected objects 160 provided by sensor 120 may be represented on the display as output unit 150, in particular on a display 150 of a mobile unit 110 as text, by symbols, pictograms, or also in the form of an image, for example, in the form of a situation image from the bird's eye view. Alternatively, the indication may also be carried out acoustically or in another form.

Figure 2:
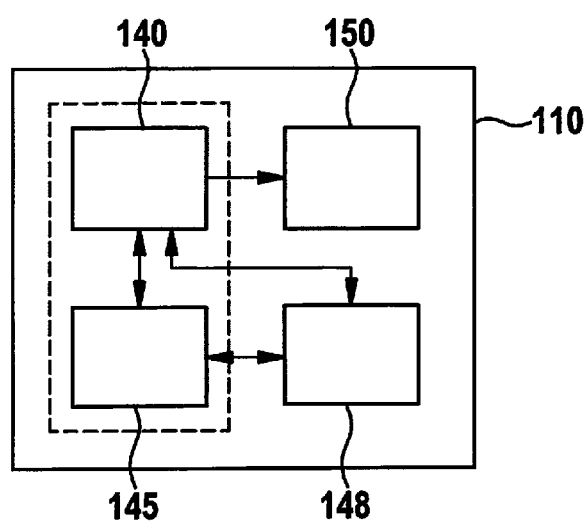
FIG. 2 schematically shows by way of example, a control unit of a mobile unit for a driver assistance system according to the present invention.

FIG. 2 shows by way of example a control unit 140 according to the present invention. In this specific embodiment, control unit 140 is a processor of a mobile unit 110, in particular of a smartphone, the processor being controlled via an APP (application software) implemented on mobile unit 110, on which an APP (application software) 145 is executed. Control unit 140 is configured to process object properties before forwarding to output unit 150, in particular as a function of inputs of the user received via an input mask of APP 145. The user may be enabled, for example, to make a selection from a plurality of object properties, or to influence the representation of the object properties. In this way, it is possible, for example, to represent object properties of multiple objects 160 in the surroundings of the motor vehicle in diagram form, or using color-coding.

If internal functions of smartphone 110 may be accessed by APP 145, for example, the camera of smartphone 110 or sensors 148 integrated into the smartphone, then this access may be used to also consider information obtained by this access during the processing of the object properties. Thus, for example, the camera of smartphone 110 may be used to obtain a picture of the vehicle surroundings and to identify those objects 160 in this picture, whose object properties are detected by sensor 120 and transmitted to control unit 140, using corresponding image recognition algorithms that are integrated into APP 145. An output to the user may then be carried out in such a way that an actual camera image of the vehicle surroundings is displayed in display 150 of smartphone 110, the object properties of objects 160 located in the camera image being superimposed on the camera image.

This superimposition is carried out intuitively. For example, a road user in the surroundings of the motor vehicle, which moves at a certain speed and whose speed has been ascertained by sensor 120 as an object property, is displayed simultaneously in display 150 of smartphone 110 and is identified there by a colored frame, the color of the frame being subject to a certain intuitive color coding. Thus, for example, road users which are moving faster than the motor vehicle itself may be identified with red frames. Conversely, road users which are moving slower than the motor vehicle itself may be identified with green frames. A gradual gradation along a certain continuous color spectrum is hereby also possible.

Basically, a projector may also be used as output unit 150 which, for example, generates a projection onto a windshield of the motor vehicle so that the user may be informed at all times about potential objects and their object properties during the driving operation using the easily visible windshield.

Furthermore, road users, which are located on a collision course with the motor vehicle, ascertained on the basis of the object data by control unit 140, may be identified on output unit 150, in particular on display 150 of smartphone 110, by a red blinking frame.

The present invention is not limited to the described exemplary embodiments, but instead also includes other similar specific embodiments. The description of the figures is only used for understanding the present invention.

What is claimed is:

1. A driver assistance system for a motor vehicle, comprising:
   at least one sensor adapted to be physically joined to a body of the motor vehicle and electrically connected to a battery of the motor vehicle to detect object properties of objects which are located in surroundings of the motor vehicle;
   an interface;
   an output unit to transmit the object properties to a user; and
   a control unit;
   wherein:
      at least one of the control unit and the output unit is housed in a device capable of being carried on a person of a driver into and out of the motor vehicle,
      the sensor transmits the object properties to the interface in the form of a first signal,
      the interface transmits the object properties, received in the form of the first signal, to the control unit in the form of a second signal,
      the control unit is configured to forward the object properties, received in the form of the second signal, to the output unit and to control the output of the object properties by the output unit,
      the control unit is a processor of a smartphone, on which an application software (APP) is executed, the control unit being configured to process the object properties before forwarding to the output unit, as a function of inputs of a user received via an input mask of the APP,
      the control unit monitors the object properties for predetermined properties with respect to at least one of: (i) a course of the motor vehicle, and (ii) a speed of the motor vehicle, for imminent collisions or predetermined safety distances, and the predetermined properties being identified through comparison of one or multiple of the object properties with threshold values of the object properties stored in a memory of the control unit, and the control unit outputs to the user at least one of: (i) a visual warning, and (ii) an acoustic warning, via the output unit if a predetermined property of the object properties has been ascertained.

2. The driver assistance system as recited in claim 1, wherein the processing of the object properties includes that the object properties are processed as a function of data detected by at least one sensor of the mobile unit.

3. The driver assistance system as recited in claim 1, wherein the processing of the object properties includes that at least one of: (i) the object properties are incorporated into a graphic or a diagram, and (ii) the object properties are superimposed with a camera image from a camera of the mobile unit.

4. The driver assistance system as recited in claim 1, wherein the control unit is a processor of a navigation system which is installed in the motor vehicle.

5. The driver assistance system as recited in claim 1, wherein the output unit is a display of the smartphone, the object properties being transmitted to the user at least one of: (i) in the form of a graphic output of the APP, and (ii) acoustically.

6. The driver assistance system as recited in claim 1, wherein the output unit is part of a GPS navigation device of the motor vehicle, the object properties being transmitted to the user via the GPS navigation device of the motor vehicle in at least one of: (i) visual form, and (ii) acoustic form.

7. The driver assistance system as recited in claim 1, wherein the output unit is a projector which transmits the object properties to the user in visual form, the visual transmission being carried out in the form of a projection onto a windshield of the motor vehicle.

8. The driver assistance system as recited in claim 1, wherein the first signal is a CAN signal as is also used in a CAN (Controlled Area Network).

9. The driver assistance system as recited in claim 1, wherein the second signal is a Bluetooth signal, the interface converting the first signal into a Bluetooth signal.

10. The driver assistance system as recited in claim 1, wherein the second signal is a WLAN signal, the interface converting the first signal into a WLAN signal.

11. The driver assistance system as recited in claim 1, wherein the object properties are associated with respective values, wherein the output unit is a display of the smartphone and the object properties of different objects are grouped in accordance with the respective values, different marking intensities being assigned to the groups in the output unit.

12. The driver assistance system as recited in claim 1, wherein the object property is a differential speed of the motor vehicle, the differential speeds of the objects being color coded in the output unit.

13. The driver assistance system as recited in claim 1, further comprising:

an additional output unit, the control unit forwarding the output of the object properties to the output unit and to the additional output unit.

14. The driver assistance system as recited in claim 13, wherein the control unit is a processor of a smartphone, on which an application software (APP) is executed, the output unit being the display of the smartphone, the additional output unit being the display of a navigation device, and the forwarding of the object properties to the additional output unit being carried out by a mirroring function of the APP executed on the processor of the smartphone.

* * * * *